Sept. 4, 1956                R. E. FIDLER                2,761,715
              BALL JOINT AND METHOD OF ASSEMBLING SAME
                      Filed May 14, 1953
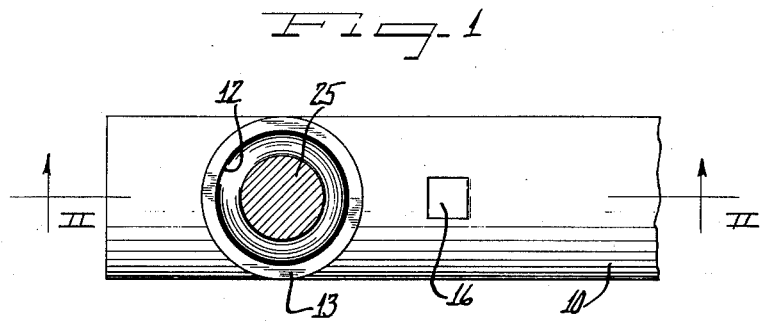
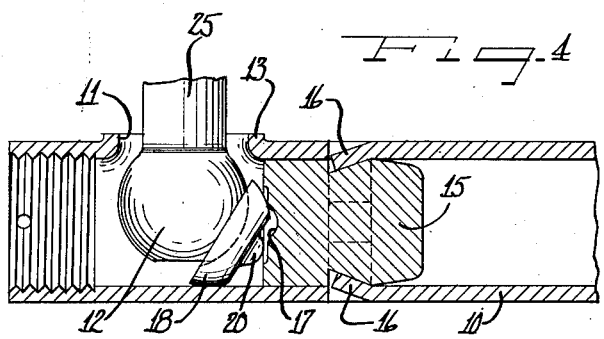
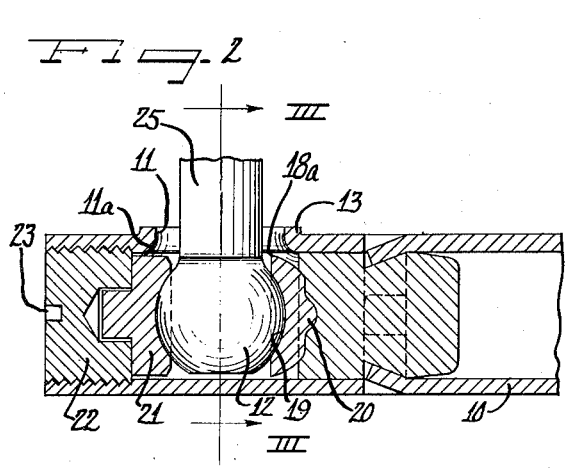
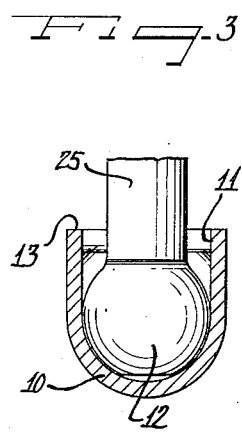
Inventor
Robert E. Fidler

United States Patent Office 2,761,715
Patented Sept. 4, 1956

2,761,715

BALL JOINT AND METHOD OF ASSEMBLING SAME

Robert E. Fidler, Royal Oak, Mich., assignor to Thompson Products, Inc., Cleveland, Ohio, a corporation of Ohio Application May 14, 1953, Serial No. 355,101

5 Claims. (Cl. 287—90)

This invention relates to joints and particularly to the type of joint commonly known as a ball joint. More specifically, the invention relates to a novel ball joint housing which provides a maximum in strength and safety while at the same time simplifying assembly technique.

I am of course aware that numerous ball joints have been developed in the prior art. However, prior art ball joints known to me have all had weaknesses. In ball joint constructions common in the automotive art, for example, the joint is usually manufactured from sheet metal tubing which forms the wall joint housing, and which has a laterally opening aperture through which the stud of the ball joint extends. The laterally opening aperture has in the past, caused a ball joint which was materially weakened at the point of maximum stress application, namely, at the wall of the tubing immediately adjacent the central axis of the ball.

Further, safety has generally required that the aperture be key-hole in shape to permit the insertion of the ball through an enlarged portion of the key-hole with a subsequent movement of the ball lateral of its axis along the narrow portion of the key hole to a position of final assembly. This was dictated by the need for maximum safety and was considered necessary in order to prevent the possibility of the stud passing out through the enlarged aperture.

The use of the elongated key hole aperture weakened the housing even more than a plain lateral aperture, and further it weakened the ball joint stud itself. The narrow nature of the key hole slot required that the ball joint stud be necked down to a reduced diameter immediately adjacent the ball in order to permit it to pivot through the necessary angle without abutting the sides of the narrow portion of the key hole slot.

It is therefore an object of the present invention to provide a ball joint utilizing a ball having a stud with a maximum diameter in combination with a tubular housing having a circular opening rather than a key hole aperture while at the same time providing ready assembly, maximum safety and free pivotal movement.

A further object of the present invention is to provide a novel ball joint utilizing a reenforced circular laterally opening aperture in the ball joint housing and providing positive means for preventing the ball from becoming separated from the ball joint housing.

Still another object of the present invention is to provide a novel ball joint having a ball socket part so constructed that the ball stud need not be necked down.

Yet a further object of the present invention is to provide a novel ball joint construction utilizing no springs but which is readily assembled.

Still a further object of the present invention is to provide a novel ball joint having a tubular housing with a lateral, circular aperture therein for the accommodation of a ball stud, which joint may be assembled and used with the ball stud positioned in the center of the lateral aperture.

A feature of the present invention is the provision of an interlocking ball seal which may be readily manipulated within the ball joint housing during assembly thereof.

Yet another feature of the present invention is an abutment means for positively locating the operative condition of the stud and for holding and cooperating with said ball socket.

Yet a further object of the present invention is to provide a ball joint having a tubular housing, which housing has a laterally opening aperture within which the ball joint stud is concentrically located during assembly and use.

Still other and further objects will become apparent to those skilled in the art from a consideration of the following detailed description taken in connection with the attached drawing in which a single embodiment of the present invention is shown by way of illustration only.

On the drawings:

Figure 1 is a plan view in partial section showing the ball joint of the present invention in assembled form;

Figure 2 is a cross sectional view of the joint taken along line II—II of Figure 1;

Figure 3 is a cross sectional view, in partial section taken along the line III—III of Figure 2; and Figure 4 is a sectional view in partial cross section along line of II—II of Figure 1 and showing the ball joint of the present invention in a partially assembled condition.

As shown on the drawings:

As may be seen from a consideration of the several figures of the drawings, the present invention contemplates the utilization of a generally tubular housing member 10. In normal use this housing may be a drag link or tie rod, or other similar connecting link at the end of which it is desired that a ball joint be placed.

A laterally opening aperture 11 is provided adjacent the end of the tubular housing 10 and is of a diameter only slightly larger than the outer diameter of the ball 12. In the actual production, it is desired that the diameter of the ball 12 be substantially equal to the inside diameter of the aperture 11 so that the ball 12 may barely pass through the aperture. In this manner the diameter of the aperture is maintained at a minimum, thereby keeping the strength of the joint at its maximum.

In order to retain the maximum strength in the housing, the aperture 11 is constructed with a reenforced peripheral edge 13. This edge is constructed during the manufacture of the aperture 11 by outwardly swaging the aperture rather than by drilling it through the side of the housing 10. In such a manufacturing step, the housing 10 is provided with an axially extending slot slightly shorter in length than the diameter of the finished aperture 11, and having only a very narrow width. This slot is then outwardly swaged by means of an expanding die preferably actuated from within the tubular housing 10.

The finished aperture 11 is, as may be seen from Figures 1 and 3, an expanded, substantially tubular, opening which intersects the tubular housing 10 at right angles to the axis of the latter. Due to the fact that a very small amount of material is actually removed from the slot utilized in initiating the manufacture of the aperture, the strength of the tube at the aperture is only slightly reduced. Further the substantially circular shape of the aperture 11 provides a reenforcing effect against the lateral bending stresses which is superior to that of a key hole type of slot generally used in the prior art.

While, as explained above, these are numerous advantages to be found in the utilization of a circular aperture as compared with the prior art key hole shaped apertures and apertures without reinforcement ridges, nevertheless such an aperture has not generally been utilized in the prior art. This has been due to the difficulties found in assembly, and further to the requirement for absolute safety against inadvertent disassembly of the ball joint unit. While these problems had remained unsolved in the prior art, they are, through the use of the present invention, completely overcome thereby providing a simple, yet extremely strong and readily assembled ball joint.

As may be clearly seen from Figure 4, an abutment 15 is positioned within the housing 10 and maintained in position against longitudinal movement in either direcion by means of the inwardly pierced flanges 16. This abutment is provided with an irregularly shaped recess 17 at the left hand end thereof as is viewed in Figures 2 and 4 for cooperation with an interlocking ball seat 18. The ball seat 18 is provided with a segmental spherical recess 19 which cooperates with the ball 12 to provide a ball joint socket. On the opposite side of the seat from the recess 19, the seat 18 is provided with an irregularly shaped interlocking abutment 20 which cooperates with the recess 17, as shown in Figure 2, to provide an interlocked seat and abutment structure in which the seat 19 is prevented from moving laterally relative to the abutment 20 after the parts are assembled.

The necessity for a separate ball seat such as 18 may readily be seen from a consideration of Figures 2 and 4. As may be seen the distance from the peripheral flange 18a of the seat 18, to the point 11a of the aperture 11, as shown in Figure 2, is less than the diameter of the ball 12. Under such circumstances it is clear that it would be impossible for the ball 12 to be inserted through the aperture 11 after the socket or seat 18 was in position. Likewise it is clear that it would not be practicable to provide an integral abutment and seat in an installation in which it is desired to utilize the smallest possible lateral aperture 11 in combination with a ball stud which is to be assembled through the aperture 11 from a lateral direction. It is therefore necessary that the seat 18 be movable relative to the abutment in a manner shown in Figure 4 in which the seat 18 is shown to lie below its final assembled position with its outer periphery actually lying somewhat in the recess 17. This positioning permits the ball 12 to be passed through the aperture 11 without difficulty. After insertion of the ball 12 through the aperture 11 it may be moved slightly to the left as viewed in Figure 4 and the socket or seat 18 may then be straightened by manipulating parts 10 and 12 until the parts 12, 18 and 15 lie in the position shown in Figure 2.

After the parts have become assembled as above described and as shown in Figures 2, the final assembly steps are taken. In completing the assembly the seat member 21 is inserted axially through the open end of the housing 10 and is backed up by the usual closure plug 22. The closure plug 22 preferably is provided with a screwdriver notch at 23 and may be maintained in adjusted type position by any number of means such as for example, a cotter key or other similar fastening means, not shown.

In the finally assembled form shown in Figure 2, it will be apparent that no springs whatever are utilized and no danger is present of the parts becoming inadvertently disassembled since, as explained above, the distance between 11a and 18a is less than the diameter of the ball. It will be apparent further that no springs are necessary in the present installation since no resiliency is required in the abutment 15 or the seat 18 to permit the assembly of the device, and particularly the ball 12, through the lateral aperture 11. The actual frictional contact of the various parts may of course be adjusted by means of the closure member 22 which may be tightened or loosened as necessary.

In view of the fact that the ball 12 with its stud 25 is positioned concentrically with the axis of the aperture 11 rather than in a narrow key hole slot or other similarly configured slot as in the prior art, the stud 25 need not be necked-down. Instead, it may be constructed in cylindrical form as shown in the various figures of the drawing, thereby providing maximum strength immediately adjacent the ball. This increased strength adds a further measure of safety to the device and effectively eliminates any possibility of breakage of the joint at the shank of the ball stud immediately adjacent the ball 12. In view of the concentric position of the ball and the stud relative to the aperture 11 there is sufficient room for a universal pivoting action of the degree required in joints of this type.

It may thus be seen that I have provided a novel ball joint assembly which provides a maximum in safety by retaining the maximum possible amount of material in both of the ball joint housing and the ball joint stud itself. While accomplishing this end, the novel construction herein provided also permits rapid assembly of the parts without the need for springs or other unsafe resilient mechanisms. Thus, a very rigid joint is provided which will not change its adjustment under load and which is, further, extremely simple and safe. In view of the rigid requirements of the automotive industry, for example, it is apparent that this joint has provided a structure far superior to those of the prior art.

It is of course understood that variations and modifications may be made in the above described ball joint without departing from the scope of the novel concepts of the present invention.

I claim as my invention:

1. A ball joint comprising a substantially tubular housing having a tubular bore with a laterally opening circular aperture associated therewith, a ball stud for positioning in said aperture, said ball stud having a diameter substantially equal to the inside diameter of said aperture, an abutment member secured in said bore within said housing immediately adjacent said aperture and having a shallow recess in the end thereof adjacent said aperture, an interlocking ball seat having a concave segmental spherical surface for cooperation with said ball and having a generally tapering peripherally relieved opposite surface having a configuration for cooperation with the recess in said abutment member whereby said interlocking seat may be positioned at an angle relative to said abutment member during assembly of said ball through said aperture, after which the interlocking seat may be shifted into position in said recess to form a substantially rigid seat for said ball, and means retaining said ball against said concave surface of said interlocking seat.

2. A non-resilient ball joint comprising a housing having a tubular bore having a substantially circular lateral aperture therein, an abutment member secured within said housing bore adjacent said aperture, said abutment member having a recess with a non-uniform configuration at the end of said abutment member adjacent said aperture, an interlocking ball seat having a face of a diameter substantially equal to the inside diameter of said housing and provided with a concave segmental spherical surface for cooperation with a ball and an opposite surface having a non-uniform configuration for cooperation with the recess in said abutment member, the surface of said ball seat having said non-uniform configuration also having a wall generally tapering away from the side having the segmental spherical recess whereby the effective diameter of said interlocking seat member is less than the diameter of the housing, thereby permitting movement of said interlocking seat about in said housing to permit an introduction of said ball into said housing through said circular aperture and the final positioning of said ball in concentric relation to said aperture and in contact with said segmental spherical surface, and means retaining said ball stud against said concave surface of said interlocking seat.

3. A non-resilient ball joint comprising a substantially tubular housing having a bore therein with an opening at the end thereof and a laterally opening reenforced, substantially circular aperture adjacent said open end, an abutment member in said housing bore adjacent said aperture at the side thereof opposite from said end, a non-uniformly configurated recess in said abutment member, an interlocking seat member having a cooperating configuration thereon for positioning in said recess and having on the opposite face thereof a segmental spherical recess for cooperation with a ball, said opposite face having a diameter substantially the same as the inside diameter of said housing, a ball stud having a diameter substantially equal to the diameter of said aperture for insertion laterally therethrough into position adjacent said interlocking ball seat, and a second ball seat positioned against said ball adjacent the open end of said tube and maintained in tight position against said ball by a closure plug in the open end of said tubular housing.

4. The method of assembling a ball joint having a ball universally mounted in a tubular housing, which comprises positioning a fixed abutment member within said housing immediately adjacent a lateral opening therein, positioning a movable ball seat adjacent said abutment member but in an angular position relative thereto so that said seat does not block said aperture, inserting the ball laterally through said aperture, pivoting said ball seat relative to said ball into interlocking cooperation with said abutment member and in a position blocking said aperture whereby said ball may not be removed through said aperture, and positioning a second ball seat at a point opposite first ball seat for tightly maintaining said ball between said seats in pivotal relation thereto.

5. A ball joint comprising a substantially tubular housing having a longitudinally extending bore with a laterally opening circular aperture associated therewith, a ball stud for positioning in said aperture, said ball stud having a diameter substantially equal to the inside diameter of said aperture, an abutment member secured within said housing bore immediately adjacent said aperture and having a recess in the end thereof adjacent said aperture, an interlocking ball seat member having a rear surface engageable in said recess and a front, segmental spherical, concave surface for engagement with said ball, said front surface having a peripheral edge projecting into partial alignment with said aperture when said ball seat is positioned with said rear surface in assembled engagement with said recess whereby said stud is prevented from withdrawal through said aperture when said seat is positioned in its assembled relationship with said recess, said rear face being relieved whereby said seat may be tilted within said housing to permit withdrawal of its rear surface from said recess and removal of its front surface diameter from the path of removal of said ball stud whereby said ball stud may be removed or inserted through said aperture when said seat is in its tilted, non interfering, position, means retaining said ball against said concave surface after insertion of said ball through said aperture.

References Cited in the file of this patent

UNITED STATES PATENTS

| | | |
|---|---|---|
| 854,566 | Cameron | May 21, 1907 |
| 1,073,264 | Mayer et al. | Sept. 16, 1913 |
| 1,451,964 | Schultz | Apr. 17, 1923 |
| 1,537,529 | Enberg | May 12, 1925 |
| 1,551,654 | Garman | Sept. 1, 1925 |
| 1,596,029 | Spire | Aug. 17, 1926 |
| 1,610,769 | Graham | Dec. 14, 1926 |
| 1,625,795 | Crawford | Apr. 26, 1927 |
| 1,985,728 | Ingersoll | Dec. 25, 1934 |
| 2,516,767 | Graham | July 25, 1950 |
| 2,621,088 | Cole | Dec. 9, 1952 |

FOREIGN PATENTS

| | | |
|---|---|---|
| 59,713 | Switzerland | Mar. 18, 1912 |